Figure 1:
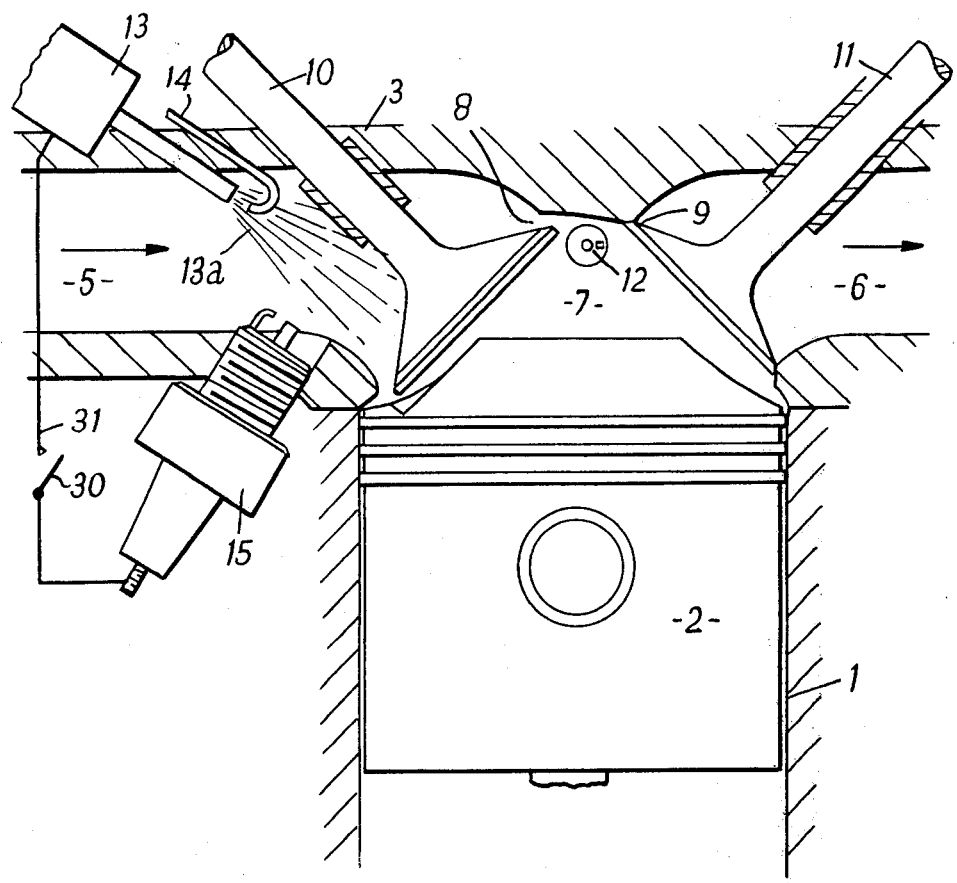

United States Patent [19]
Ansdale

[11] 3,911,890
[45] Oct. 14, 1975

[54] STARTING OF DIESEL ENGINES AND MIXTURE-COMPRESSING INTERNAL-COMBUSTION ENGINES

[76] Inventor: Richard Franz Karl Ansdale, 12 Roundwood Grove, Hutton Mount, Shenfield, Essex, England

[22] Filed: Dec. 18, 1973

[21] Appl. No.: 426,287

Related U.S. Application Data
[63] Continuation-in-part of Ser. No. 233,153, March 9, 1972, abandoned.

[30] Foreign Application Priority Data
Mar. 21, 1971 United Kingdom............... 6793/71

[52] U.S. Cl.......................... 123/179 H; 123/122 G
[51] Int. Cl.²................... F02N 17/00; F02M 31/00
[58] Field of Search.......... 123/122 G, 179 L, 34 A, 123/179 H

[56] References Cited
UNITED STATES PATENTS
| | | | |
|---|---|---|---|
| 1,469,903 | 10/1923 | Good | 123/122 G |
| 2,915,377 | 12/1959 | Reichhelm | 123/122 G |

FOREIGN PATENTS OR APPLICATIONS
| | | | |
|---|---|---|---|
| 522,829 | 4/1921 | France | 123/122 G |
| 120,375 | 8/1918 | United Kingdom | 123/122 G |

Primary Examiner—Charles J. Myhre
Assistant Examiner—Ronald B. Cox
Attorney, Agent, or Firm—Scrivener Parker Scrivener and Clarke

[57] ABSTRACT

In order to facilitate the starting of a mixture-compressing combustion engine whose mixture is formed by a fuel atomizer nozzle in its induction system, the engine is equipped, in addition to the igniter operative in each working chamber, with a further igniter arranged adjacent to the or each atomizer nozzle in the induction system, the latter being constructed to permit, when the further igniter is operated while the engine is turned-over prior to a starting operation, all the spray of injected fuel from the nozzle to be burned in the induced air flow as the latter is aspired into the engine, thus produces maximum heat for warming the cylinder walls and any part of the induction passages from the point of injection. The pre-heating flame is extinguished as the engine is changed over to the normal starting sequence.

5 Claims, 3 Drawing Figures

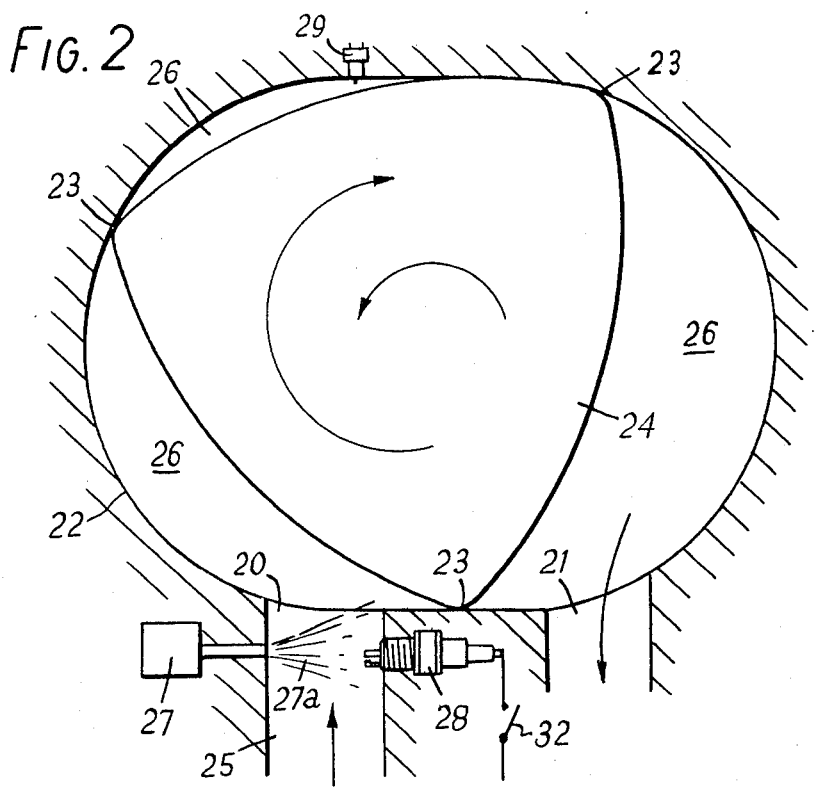
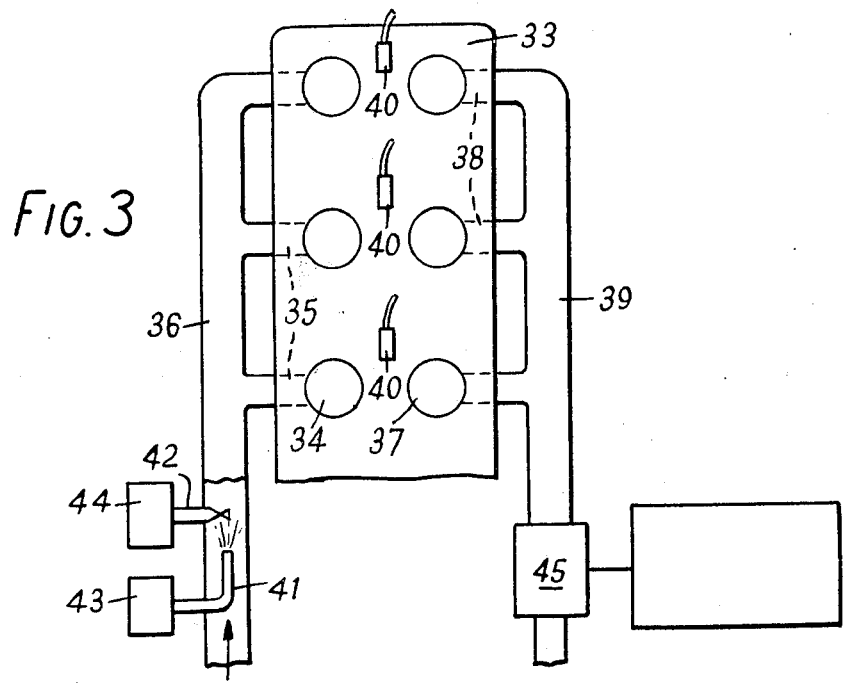

STARTING OF DIESEL ENGINES AND MIXTURE-COMPRESSING INTERNAL-COMBUSTION ENGINES

The present application is a continuation-in-part of my application Ser. No. 233,153 filed Mar. 9, 1972, now abandoned.

This invention relates to internal-combustion engines of the kind in which successive discrete quantities of air-and-fuel mixture formed by the injection of fuel into the flow of combustion air are individually compressed prior to being ignited for the production of mechanical power, and it is applicable both to engines in which the compression and combustion takes place in a working chamber constituted by a cylinder having a reciprocating piston and to engines in which a displacement member is arranged to revolve continuously in a closed path to provide a working chamber of alternatingly decreasing and increasing volume for the compression, ignition and working expansion of a gaseous medium.

Such engines of either of these types will hereinafter be called of the kind specified. A variety of engines of the kind specified are in practice difficult to start from a cold condition. This applies more particularly when these are required to work on low-volatile fuels.

Under cold conditions, and particularly at low ambient temperatures, the droplets of liquid fuel suspended in the mixture at the beginning of the compression will tend to become precipitated on the walls of the working chamber and in any part of the induction passages in which they are present, especially so when low-volatile fuel is used, so that when at the end of the compression period a spark is produced in order to effect ignition, the mixture in the vicinity of the spark will be unsuitable for ignition.

It is an object of the invention to provide an improved engine of the kind specified which, with a minimum of additional equipment, provides for effective pre-conditioning of the engine prior to starting the operation of the engine, to avoid these inconveniences.

According to the invention reliable starting is greatly facilitated by providing a further ignition device so arranged at each mixture-forming point of the induction system as to initiate, when operated, combustion, in the said flow of combustion air, of the fuel injected at said mixture-forming point, the induction system being so constructed as to permit free progression of the combustion from said point of injection towards the associated working chamber and thus substantially complete combustion of all the fuel in the fuel-and-air mixture formed at such mixture-forming point is mechanically driven prior to a starting operation, all the injected engine fuel to be ignited, for substantially complete combustion, at its point of entry into the flow of air that is admitted to the working chamber or chambers of the engine.

It will be readily appreciated that the use of this preheating system prior to the starting of the engine will not only greatly facilitate the subsequent starting of the engine but that the resultant flow of hot gases through the engine exhaust system is also available for preheating a thermal reaction exhaust purifier with which the engine may be equipped.

In the case of engines operating with so-called port injection, that is to say of engines in which fuel is injected into the induction passage of each cylinder or other working chamber in close proximity to the inlet valve or port opening into the working chamber, the injection system serving for the normal operation of the engine can be utilised for the purpose of the present invention by providing, in addition to the normal ignition arrangement in the cylinder, which is operative at or near the point of maximum compression, a spark plug or equivalent igniter so arranged in close proximity to the injection system of each port so as to cause, when operating, all the fuel thus injected to be ignited for substantially complete combustion, thus making all the calorific value of the injected fuel available for heating the wall surfaces with which, in normal operation of the engine, the fuel-and-air mixture formed at the point of injection makes contact before being ignited to produce power in the engine. In conjunction with this an ignition-control device is preferably provided which, when the engine is mechanically driven for preheating prior to a starting operation, is arranged to initiate combustion of the injected fuel during the periods in which the inlet port is opened for the admission of mixture to the working chamber. The latter is thus charged with hot combustion gases, and these will raise the temperature of the cylinder walls, within a few revolutions, to approximately the normal working temperature of the engine so that, when the auxiliary igniter is then switched off for executing a starting operation, the aspired mixture admitted to the cylinder for the starting operation will find the cylinder walls substantially at the normal operating temperature of the engine, thus ensuring evaporation rather than precipitation of any suspended droplets of fuel in the mixture.

It will be readily appreciated that this preheating arrangement is applicable not only to engines working on a four-stroke cycle but also to engines working on a two-stroke cycle, since injection and burning of the fuel during pre-heating is arranged to take place at the transfer port, and thus the preheating flame will be kept away from the interior of the crank case of the engine, even if the crank case is used for pre-compression of the air.

If the invention is applied to a mixture-compressing engine with fuel injection into a manifold, the fuel-injection nozzle system employed for the normal operation of the engine can also be used for effecting the preheating, provided that the injection nozzle is supplemented by a suitable igniter arrangement within the range of the fuel-injection spray.

In order that the invention may be more readily understood, three embodiments of the invention will now be described in more detail with reference to the accompanying drawings, in which FIG. 1 is a part-sectional elevation showing the invention as applied to a cylinder of an overhead-valve Otto-cycle engine with port injection of the operating fuel, FIG. 2 is a diagrammatic plan view showing the application of the invention to a Wankel-type engine having a continuously moving displacement member, and FIG. 3 is a diagrammatic plan view showing the invention applied to a multi-cylinder engine.

Referring now first to FIG. 1, which is a section at right angles to the shaft of a mixture-compressing piston engine, an engine cylinder 1, which is attached at one end to a cylinder head 3, and in which a piston 2 reciprocates to drive a crank shaft, not shown, in the usual manner, is arranged to operate on the four-stroke Otto cycle. During a so-called induction stroke, air is aspired from an inlet duct 5 into the cylinder via an inlet port 8, and at a point immediately preceding the inlet port 8, fuel is injected by an injection nozzle 13 into the air entering the cylinder. The nozzle 13 is illustrated as of the kind described in U.S. Pat. No. 3,613,649. According to that patent a flow of fuel is continuously emitted from the nozzle and arranged to normally reach a collector tube 14 as a solid jet which will pass-on through this collector tube without transmitting any appreciable amount of fuel to the air in the induction duct, but during a variable period of time during each induction stroke, the axial flow is arranged to be atomized by ultrasonic vibration of the nozzle 13 and as a result will be admixed to the air in the induction duct, so that the engine will be supplied with an amount of fuel proportional to the length of time of energisation of the ultrasonic vibrator. The cylinder thus becomes filled with an air-and-fuel mixture which is then, in the next stroke, compressed into a combustion chamber 7 provided in the cylinder head 8. Near the end of that stroke, a spark is produced in a sparking plug 12 to ignite the mixture and thus to initiate combustion in order to supply power during an expansion or working stroke, and finally the burned mixture is, during an exhaust stroke, expelled to an exhaust line 6 through an exhaust port 9 controlled by an exhaust valve 11.

It will be appreciated that, particularly when the fuel employed is of moderate or low volatility, during the induction and compression strokes, when the induced air and the walls of the cylinder 1 and of the cylinder head 3 are cold, an appreciable portion of the injected fuel droplets will become precipitated on the walls of the cylinder, piston and cylinder head, leaving the compressed air contained in the combustion chamber 7 with an amount of fuel insufficient to ensure ignition, a condition which will cease once the walls in question have reached a temperature in the vicinity of the normal operating temperature of the engine.

In order to permit the walls to be heated rapidly to such a temperature before an attempt is made to start the engine, an igniter 15 is arranged in the cylinder head 3 for operation at a point closely adjacent to the inlet port 8 and within the cone of spray 13a that is produced by the injection nozzle 13 during operation of the ultrasonic vibrator so that when the igniter 15 is operated, it will ignite all the fuel injected by the nozzle 13. The engine is, in customary manner, provided with a starter motor, not shown, and when a preheating switch 30 is closed during operation of the engine-starter motor, for example when an engine-starter switch, not shown, is moved to a special preheat position, the igniter 15 is arranged to be energised by a line 31 each time the vibrator of the injector nozzle 13 is energised to commence fuel injection into the inlet duct 5 adjacent to the inlet port 3. When the preheating switch 30 is closed, the spray 13a of injected fuel will therefore be ignited whenever such spray 13a is formed, causing all the injected fuel to be burned while the thus ignited fuel-and-air mixture is aspired to flow from the inlet duct 5 into the cylinder 1 so that the hot gases produced by this combustion will warm the walls of the cylinder and combustion chamber and are then expelled through the exhaust valve 11 to escape through the exhaust duct 6. Once the desired temperature of the walls has been reached, the starter switch is transferred to its normal starting position, thereby opening the switch 30 in the igniter circuit. When thereafter, during the next induction stroke, the vibrator of the nozzle 13 is energised again, the resulting spray 13a of fuel admixed to the inlet air will not be ignited in the induction system but will, in mixture with the air aspired, enter the cylinder where, due to the raised temperature, the fuel droplets will become vaporised and no appreciable precipitation will take place on the walls so that, when a spark is then produced in the sparking plug 12 provided in the combustion chamber 7, the air-and-fuel mixture in the compression chamber will become readily ignited.

FIG. 2 illustrates the application of the invention to a so-called Wankel engine, in which a rotor 24 forms seals 23 at the circumference of a rotor housing 22 to form, between adjacent seals 23, three working chambers 26 each defined between adjacent seals 23 by respective portions of the circumference of the housing 22 and of the rotor 24, and as the rotor revolves and each chamber moves round the housing 22, the volume of each of the chambers periodically increases and decreases similarly as the volume confined in the cylinder of FIG. 1 does as a result of movement of the piston 1. The housing 22 is provided with an inlet port 20 which is arranged to be passed by each chamber 26 while the volume of the chamber increases for an induction stroke, and with an exhaust port 21 which is faced by each chamber 26 when, after consecutive reduction and increase in the volume of the chamber during a compression stroke and a working stroke, the volume of the chamber again decreases in an exhaust stroke, and it will be appreciated that since each chamber 26 leaves the inlet port 20 to be replaced by the next chamber 26 as a result of the passage of the apex seal 23 separating the two chambers when the chamber, at the end of its induction period, has reached its maximum volume, and since at that time the next-following chamber 26 increases in volume, air will be aspired from the inlet duct 25 through the inlet port 20 in a continuous flow. In order to convert this air into an air-and-fuel mixture for operation of the engine, a fuel injector 27 is arranged in the inlet duct 25. The injector may be of similar construction to the injector 13 in FIG. 1 but is arranged to emit fuel in a continuous spray 27a into the flow of air passing through the inlet duct 25 so that all the air aspired by the chambers 26 which consecutively pass the inlet duct is mixed with the requisite amount of fuel. In order to fire the fuel-and-air mixture to produce mechanical work during a subsequent expansion stroke, a sparking plug 29 is arranged at the circumference of the housing 22 near the point at which each chamber 26 reaches its minimum volume at the end of the compression stroke. The engine is also equipped with a starter motor, not shown.

It will be readily appreciated that, similarly as in the case of the reciprocating engine described with reference to FIG. 1, when the engine is to be started under cold conditions, a large proportion of the injected fuel droplets are liable to be deposited on the walls of the rotor 24 and of the housing 22, which are not hot enough to assist vaporisation before the air-and-fuel mixture reaches the position of the sparking plug 29, so that the absence of an adequate amount of fuel vapour and fuel droplets in the combustion air is liable to make starting difficult. In order to permit the relevant wall portions to be preheated prior to a starting operation, the illustrated engine is, in accordance with the invention, equipped with a further sparking plug 28 arranged inside the inlet duct 25 within the range of the spray 27a emitted by the nozzle of the injector 27 to serve as a preheating igniter, and a preheater switch 32 is provided which can be closed when the starter motor is energised to drive the engine, thus causing the spray 27a of fuel to be ignited by the preheating igniter 28 at the point where the fuel enters the air flow in the inlet duct 25 so that, similarly as in the case of the embodiment described with reference to FIG. 1, all the fuel injected into the flow of combustion air will be ignited at the mixture-forming point so that the engine will now aspire hot combustion gases instead of an air-and-fuel mixture. When the desired engine temperature has been reached, the flame ignited by the preheating igniter must be extinguished to allow an air-and-fuel mixture to be aspired for the operation of the engine. This is conveniently achieved by momentarily switching-off the vibrator of the fuel injector nozzle 27, if the nozzle is of a kind in which injection is dependent on the operation of this vibrator, or otherwise by cutting off the fuel supply or by any other suitable means. After extinguishing the flame, the fuel supply is restored and the starter motor is operated to turn the engine, whereupon ignition of the compressed air-and-fuel mixture at the location of the sparking plug 29 in the engine housing 22 will take place without difficulty.

In the embodiment of FIG. 3 the invention is applied to a multi-cylinder engine having a cylinder block 33, some of the cylinders of which are shown. Each cylinder has an inlet valve 34 controlling the admission of mixture to the cylinder through a branch 35 of a manifold 36, and an outlet valve 37 which is connected to a branch 38 of an outlet manifold 39. The latter leads to an exhaust duct 45, which is equipped with an exhaust purifier of the thermal reaction type. Each cylinder is further equipped with an ignition device 40. To form the fuel-and-air mixture for the operation of the engine, a spray-type injection nozzle 41 is provided near the inlet end of the engine intake manifold 36. In order to enable the engine to be readily warmed-up prior to starting under cold conditions, a further igniter 42, hereinafter called pre-heating igniter, is provided in the manifold, adjacent to the spray nozzle 41, and arranged, when the engine is being mechanically driven for preheating prior to a starting operation, to fire all the fuel injected at its point of injection so as to burn fuel continuously in the inlet manifold as a continuous flow of air is aspired into this manifold and distributed in cyclic sequence to the individual cylinders of the engine through the various branches 35 of the manifold 36. Control devices 43 and 44 are respectively associated with the nozzle 41 and the preheating igniter 42. When the desired engine temperature has been reached, the preheating igniter is switched off, and the supply of fuel to the spray nozzle is interrupted long enough to terminate combustion in the intake portion of the induction manifold 36 and thus to allow normal engine operation to commence thereafter.

Owing to the passage of the hot gas mixture through the engine during the preheating period, the temperature of the exhaust purifier has also been raised so as to facilitate prompt operation of the required thermal reaction when normal operation of the engine begins.

While three particular embodiments have been described, the invention is by no means limited to these, and various features of the individual embodiments may be applied to other forms of engine, in some cases subject to some modifications which will be apparent to those skilled in the art.

Thus the invention may be applied to spark-ignition engines in which the fuel is injected direct into the cylinder in substantially the same manner in which it is applied, in the embodiment of FIG. 1, to engines in which injection takes place just outside the inlet port.

What I claim is:

1. An internal-combustion engine having a working chamber or working chambers, an induction system for feeding a flow of combustion air to each working chamber, said induction system including means for injecting liquid fuel into this flow of combustion air at one or more mixture-forming points of said system to form, with said flow of combustion air, a combustible mixture, an ignition device for operation in each working chamber when said chamber, after being charged with such combustible mixture, has been isolated from the induction system and the mixture in said chamber has been compressed, and a further ignition device so arranged at each mixture-forming point of the induction system as to initiate when operated combustion, in the said flow of combustion air, of the fuel injected at said mixture-forming point, the induction system being so constructed as to permit free progression of the combustion from said point of injection towards the associated working chamber and thus substantially complete combustion of all the fuel in the fuel-and-air mixture formed at such mixture-forming point.

2. An engine as claimed in claim 1, which is a plural-cylinder engine having an inlet manifold provided with a common air intake, the engine including means for injecting, at a mixture-forming point of said air intake, liquid fuel for the operation of the engine into the air flowing along said intake, an ignition device in each cylinder of the engine for firing the mixture during operation of the engine, and a further ignition device so arranged in said intake as to effect when operated while the engine is being turned-over prior to starting firing to initiate combustion of the fuel injected at the mixture-forming point of said air intake.

3. An internal-combustion engine as claimed in claim 1, wherein each working chamber is formed by a cylinder equipped with a piston and having a mixture-inlet port connected with an inlet passage and co-operating with a flow-control means periodically isolating the cylinder from the inlet passage, an injection nozzle arranged to inject, when said inlet port is open, liquid fuel into said passage at a mixture-forming point closely adjacent to said inlet port to form a combustible fuel-and-air mixture for operation of the engine, an ignition device arranged in each cylinder for operation, when said cylinder is isolated from said inlet passage by said flow-control means, to fire the fuel-and-air mixture in the cylinder during operation of the engine, and a further ignition device arranged in said inlet passage at such a position adjacent to said mixture-forming point and operated in such a manner as to ignite all the fuel injected at said mixture-forming point, the construction of the inlet passage and of the flow-control means being such as to permit, when said inlet port is open, free progression of the combustion past said flow-control means and thus to initiate when operated, substantially complete combustion of all the fuel in the mixture formed at said mixture-forming point while the engine is being turned-over prior to a starting operation.

4. An engine as claimed in claim 3, which includes ultrasonic atomization means associated with each injection nozzle.

5. An engine as claimed in claim 1, which is a Wankel-type plural-chamber rotary combustion engine having an inlet passage leading to a mixture-inlet port arranged to co-operate in turn with each of the working chambers of the engine, an injection nozzle arranged to inject liquid fuel into said passage at a mixture-forming point closely adjacent to said inlet port to form a combustible fuel-and-air mixture for operation of the engine, an ignition device arranged for successive co-operation with each chamber when such chamber is in a position in which it is isolated from said inlet port, to fire the fuel-and-air mixture in said chamber during operation of the engine, said further ignition device being so arranged, in said inlet passage, adjacent to said injection nozzle as to effect, when operated while the engine is being turned-over prior to starting operation, firing, in said inlet passage, of the mixture formed at said mixture-forming point.

* * * * *